US012623579B2

(12) United States Patent　　　　(10) Patent No.:　US 12,623,579 B2
Pestaño et al.　　　　　　　　　　　(45) Date of Patent:　May 12, 2026

(54) SEAT ASSEMBLY

(71) Applicant: Lear Corporation, Southfield, MI (US)

(72) Inventors: Carlo Suson Pestaño, Mandaue (PH); Jose Vicente Tumulak Medrano, Lapulapu (PH); Marc Aden Loro Labrado, Danao (PH); Sergio Ando Nuñez, Cebu (PH)

(73) Assignee: Lear Corporation, Southfield, MI (US)

( * ) Notice: Subject to any disclaimer, the term of this patent is extended or adjusted under 35 U.S.C. 154(b) by 194 days.

(21) Appl. No.: 18/540,547

(22) Filed: Dec. 14, 2023

(65) Prior Publication Data

US 2025/0196740 A1　　Jun. 19, 2025

(51) Int. Cl.
　　*B60N 2/64*　　　　(2006.01)
　　*B60N 2/58*　　　　(2006.01)
(52) U.S. Cl.
　　CPC ........... *B60N 2/646* (2013.01); *B60N 2/5816* (2013.01)
(58) Field of Classification Search
　　CPC ............................. B60N 2/646; B60N 2/5816
　　See application file for complete search history.

(56) References Cited

U.S. PATENT DOCUMENTS

| | | | |
|---|---|---|---|
| 4,317,591 | A | 3/1982 | Ramsey |
| 5,890,381 | A | 4/1999 | Leeke |
| 7,703,855 | B1 | 4/2010 | Kalinowski |
| 7,946,649 | B2 | 5/2011 | Galbreath |
| 8,128,166 | B2 | 3/2012 | Hoshina |
| 9,199,564 | B2 | 12/2015 | Clauser |
| 10,086,727 | B1 | 10/2018 | Ruff |
| 10,703,238 | B2 | 7/2020 | Suzuki |
| 11,628,792 | B2 | 4/2023 | Kondou |
| 2005/0173964 | A1 | 8/2005 | Takezawa |
| 2022/0330704 | A1 | 10/2022 | Liu |

FOREIGN PATENT DOCUMENTS

| | | |
|---|---|---|
| DE | 102004044714 B4 | 4/2006 |
| JP | S6131300 U | 2/1986 |
| JP | 2017171053 A | 9/2017 |
| WO | 2021023720 A1 | 2/2021 |

OTHER PUBLICATIONS

European search report from corresponding application EP2420287 Mar. 21, 2025.

*Primary Examiner* — Anthony D Barfield
(74) *Attorney, Agent, or Firm* — McGarry Bair PC

(57)　　　　　ABSTRACT
A seat assembly comprising a cushion including a first surface, a second surface, and a through aperture extending from the first surface to the second surface; a trim cover disposed on the first surface; a trim wire detachably connected to the second surface; and a coupling connecting the trim cover to the trim wire.

20 Claims, 12 Drawing Sheets

SEAT ASSEMBLY

TECHNICAL FIELD

The present disclosure generally relates to seat assemblies, including seat assemblies that can, for example, be utilized in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, and components have not been described in detail so as not to unnecessarily obscure aspects of the embodiments.

Figure 1:
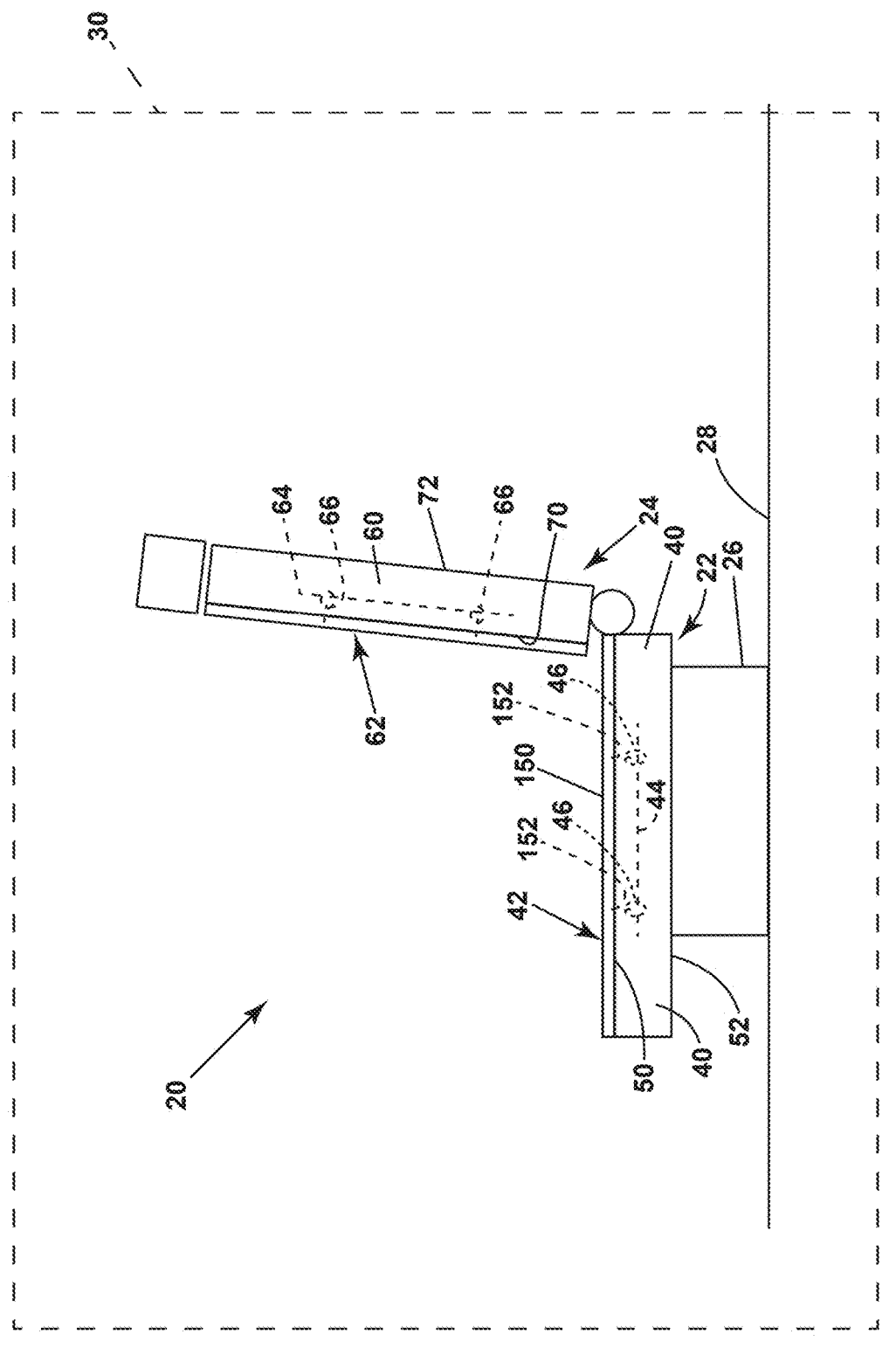
FIG. 1 is a schematic view generally illustrating an embodiment of a seat assembly according to teachings of the present disclosure.

Referring to FIG. 1, a seat assembly 20 includes a first cushion assembly 22, a second cushion assembly 24, and a seat frame 26. The first cushion assembly 22 (e.g., a seat base cushion assembly) and the second cushion assembly 24 (e.g., a seat back cushion assembly) are connected to the seat frame 26. The seat assembly 20 is connected or connectable to a mounting surface 28, which can, for example, include a floor of a vehicle 30 in vehicle implementations, but the seat assembly 20 is not limited to vehicle implementations.

The first cushion assembly 22 includes a cushion 40 (e.g., a seat base cushion), a trim cover 42 disposed on the cushion 40, a trim wire 44, and a coupling 46 connecting the trim wire 44 with the trim cover 42. The cushion 40 includes a first surface 50 and a second surface 52 opposite the first surface 50. The trim wire 44 is disposed at the second surface 52. The second cushion assembly 24 includes a cushion 60 (e.g., a seat back cushion), a trim cover 62 disposed on the cushion 60, a trim wire 64, and a coupling 66 connecting the trim wire 64 with the trim cover 62. The cushion 60 include a first surface 70 and a second surface 72 opposite the first surface 70. The trim wire 64 is disposed at the second surface 72.

Figure 2:
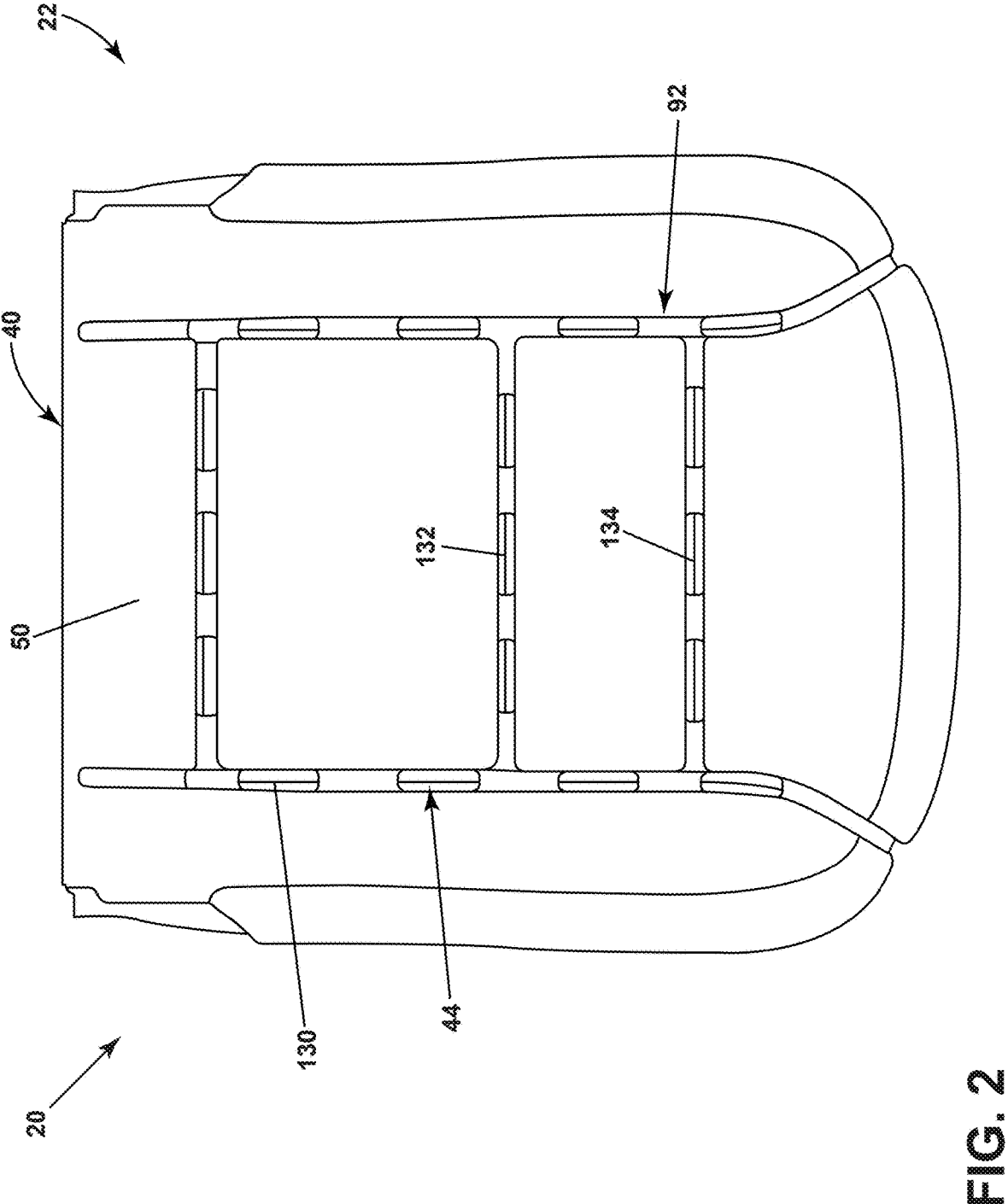
FIG. 2 is a top view generally illustrating an embodiment of a cushion assembly of a seat assembly according to teachings of the present disclosure.
Figure 3:
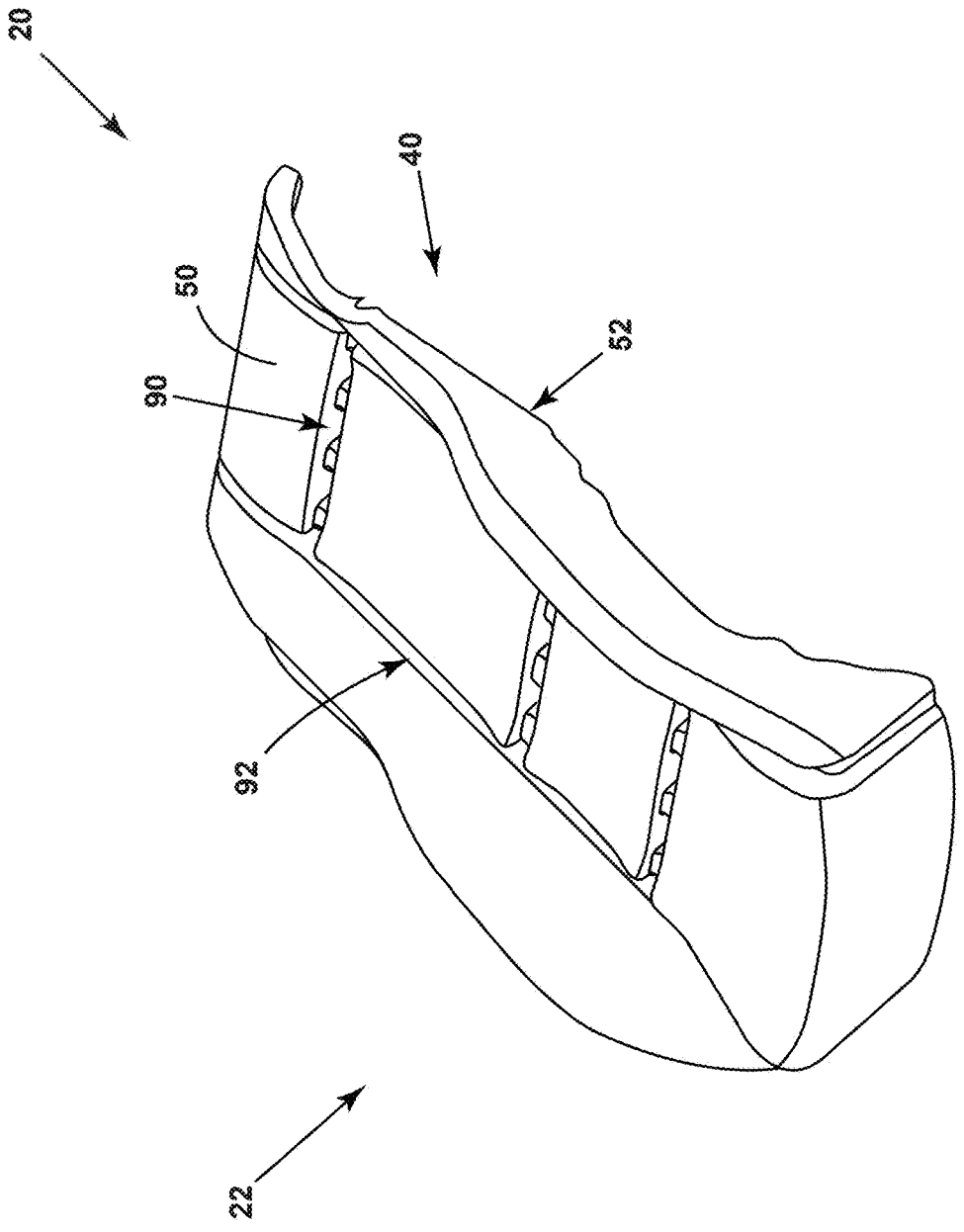
FIG. 3 is a perspective view generally illustrating an embodiment of a cushion assembly of a seat assembly according to teachings of the present disclosure.

Referring to FIGS. 2 and 3, the cushion 40 defines a plurality of through apertures 90 that extend from the first surface 50 to the second surface 52 (FIG. 1). The cushion 40 defines a recess 92 in the first surface 50. The recess 92 extends toward and short of the second surface 52. The through apertures 90 extend from the recess 92 to the second surface 52. The trim wire 44 is at least partially aligned with the through apertures 90 such that portion of the trim wire 44 are visible through the through apertures 90 when viewed from the first surface 50.

Figure 4:
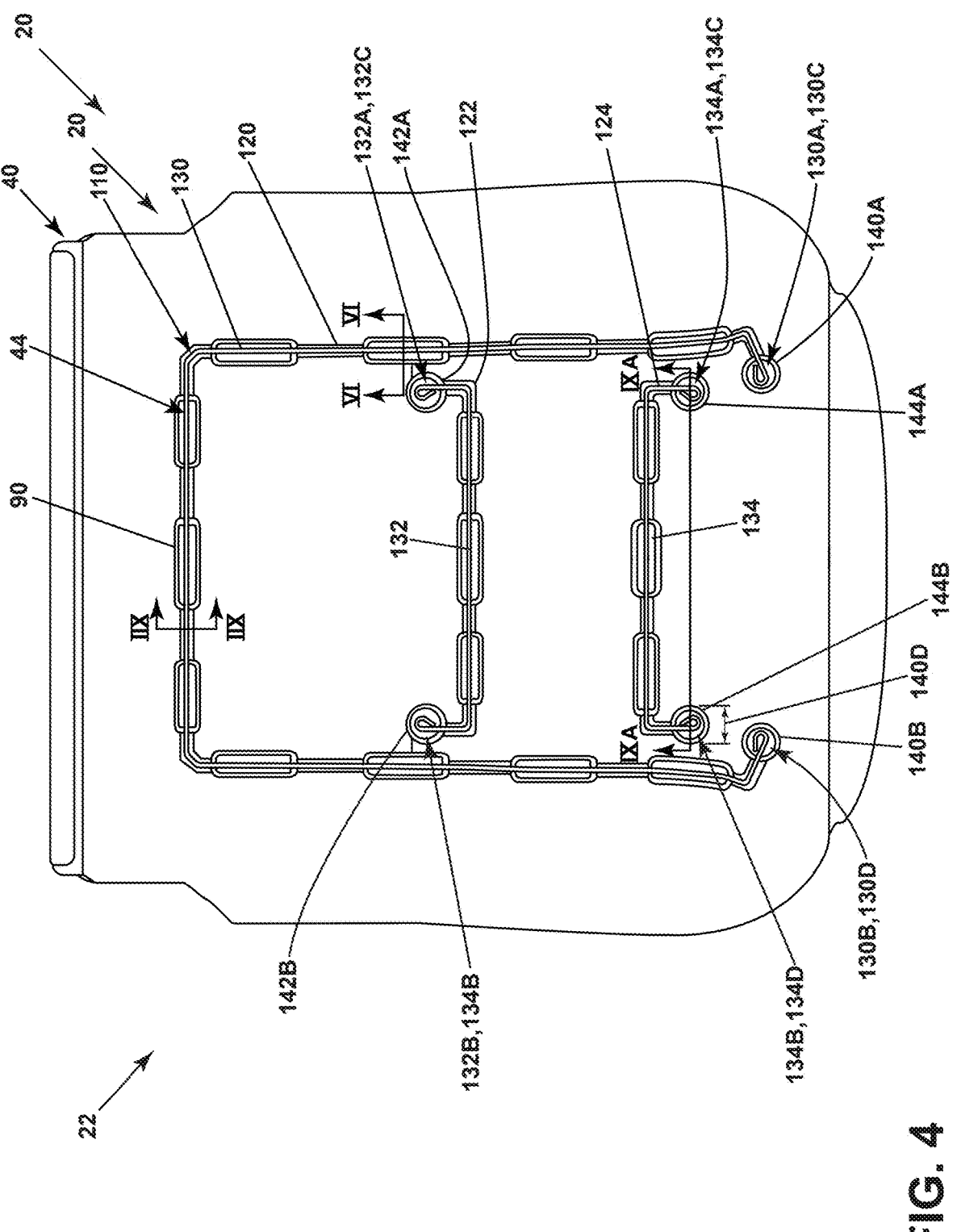
FIG. 4 is a bottom view generally illustrating an embodiment of a cushion assembly of a seat assembly according to teachings of the present disclosure.

Referring to FIG. 4, the second surface 52 of the cushion 40 includes a recess 110. The recess 110 is at least partially aligned with the recess 92 of the first surface 50 and at least partially receives the trim wire 44. The recess 110 includes one or more segments, such as a first recess segment 120, a second recess segment 122, and a third recess segment 124. The recess segments 120-124 can be separate from each other. One or more of the through apertures 90 extends to each recess segment 120-124. The trim wire 44 includes a trim wire segment 130, 132, 134 for each recess segment 120-124. The trim wire segments 130-134 can be separate from each other. The plurality of through apertures 90 can include first and second through apertures 90 that extend to the first recess segment 120, third and the fourth through apertures 90 that extend to the second recess segment 122, and/or fifth and sixth through apertures 90 that extend to the third recess segment 124.

Figure 5:
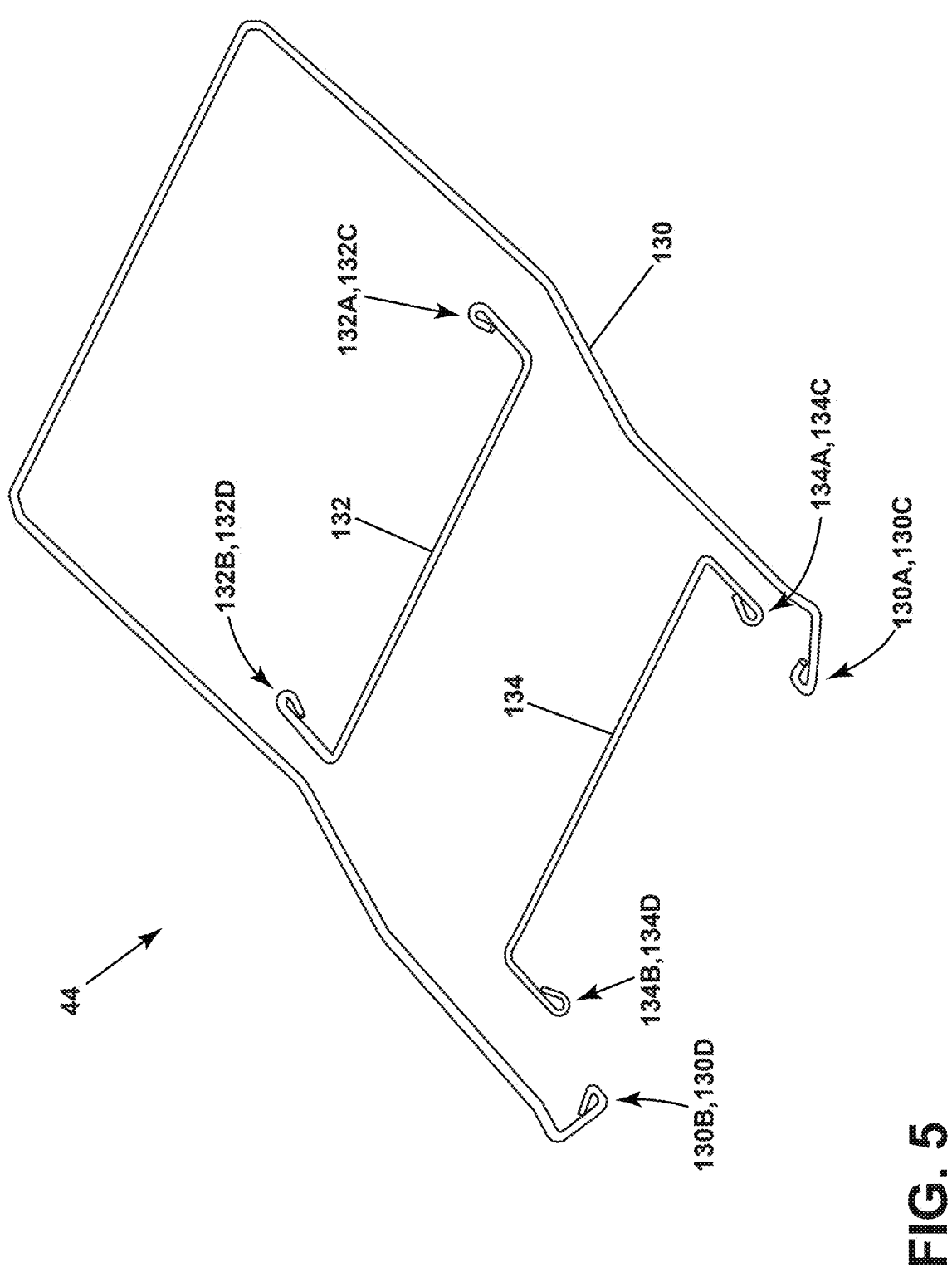
FIG. 5 is a perspective view generally illustrating an embodiment of a trim wire of a seat assembly according to teachings of the present disclosure.

Referring to FIGS. 4 and 5, the trim wire 44, such as some or all of the trim wire segments 130-134, include first ends 130A, 132A, 134A and second ends 130B, 132B, 134B. The first ends 130A-134A include and/or are formed (e.g., bent) into loops 130C, 132C, 134C and the second ends 130B-134B are formed (e.g., bent) into loops 130D, 132D, 134D. The loops 130C-134C, 130D-134D increase an effective dimension (e.g., width) of the trim wire segments 130-134, which restricts movement of the trim wire segments 130-134 in the recess 110. For example, the cushion 40 defines loop receptacles 140A 142A, 144A, 140B, 142B, 144B disposed in the second surface 52 and are connected to and disposed at the ends of the recess segments 120-124. The loop receptacles 140A-144A, 140B-144B form part of the recess 110. The loop receptacles 140A-144A, 140B-144B at least partially receive the loops 130C-134C, 130D-134D and have larger widths than the recess segments 120-124. For example, the widths of the recess segments 120-124 are smaller than the width of the loops 130C-134C, 130D-134D such that the loops 130C-134C, 130D-134D are restricted or prevented from moving from the loop receptacles 140A-144A, 140B-144B, which restricts movement of the trim wire segments 130-134, such as to help maintain the position of the trim wire segments 130-134 in the recess segments 120-124. Optionally, the loop receptacles 140A-144A, 140B-144B are cylindrical and have a diameter that is at least as large as the width of the loops 130C-134C, 130D-134D. The loops 130C-134C, 130D-134D can reduce or prevent contact between the edges of the ends 130A-134A, 130B-134B and the cushion and/or an operator (e.g., during assembly).

The through apertures 90 include a length 90L and a width 90W. The length 90L is measured in a direction parallel to the portion of the trim wire 44 aligned with the aperture 90. The width 90W is measured in a direction perpendicular to the portion of the trim wire 44 aligned with the aperture 90. Optionally, the length 90L is at least twice as large as the width 90W, and can be three or more times larger.

The recess 110 includes first width $110W_1$ at the apertures 90, a second width $110W_2$ offset from (e.g., between) the apertures 90, and a third width 140D (e.g., a diameter) at the loop receptacles 140A-144A, 140B-144B. The widths $110W_1$, $110W_2$ are measured in the direction perpendicular to the portion of the trim wire 44 disposed in the recess 110. The recess 110 includes a length 110L that is at least as long as the sum of the lengths 90L of the apertures 90 disposed along the recess 110 and at least as long the trim wire 44. The second width $110W_2$ can, for example and without limitation, be equal to or between 5% and 50% of the width 90W of the aperture 90. In some examples, the width 90W can be equal to or between 10 mm and 25 mm. The length 90L of the aperture can be longer than the width 90W.

Referring to FIG. 5, the trim wire 44 is illustrated with trim wire segments 130-134. The segments 130-134 are provided in U-shaped configurations but can include other shapes and configurations. The first trim wire segment 130 is longer than the second and third trim wire segments 132, 134 and are disposed between opposing portions of the first trim wire segment 130. The U-shaped configurations of the second and third trim wire segments 132, 134 open in opposite directions. The trim wire 44 is sufficiently rigid to not materially bend or deform (e.g., retains its shape) when connected with the trim cover 42 (FIG. 1). The trim wire 44 is a rigid metal wire, but the trim wire 44 can include other configurations. The trim wire 44, for example, may not include a rope, a cord, or other non-rigid configurations. The trim wire 44 includes a diameter 44D that is less than or equal the widths $110W_1$, $110W_2$ of the recess 110 (FIG. 4) and is sufficiently large to provide the desired rigidity and resistance to deformation when connected with the trim cover 42 (FIG. 1). Optionally, the diameter 44D is equal to or between 1 mm and 5 mm, such as 2 mm.

Figure 6:
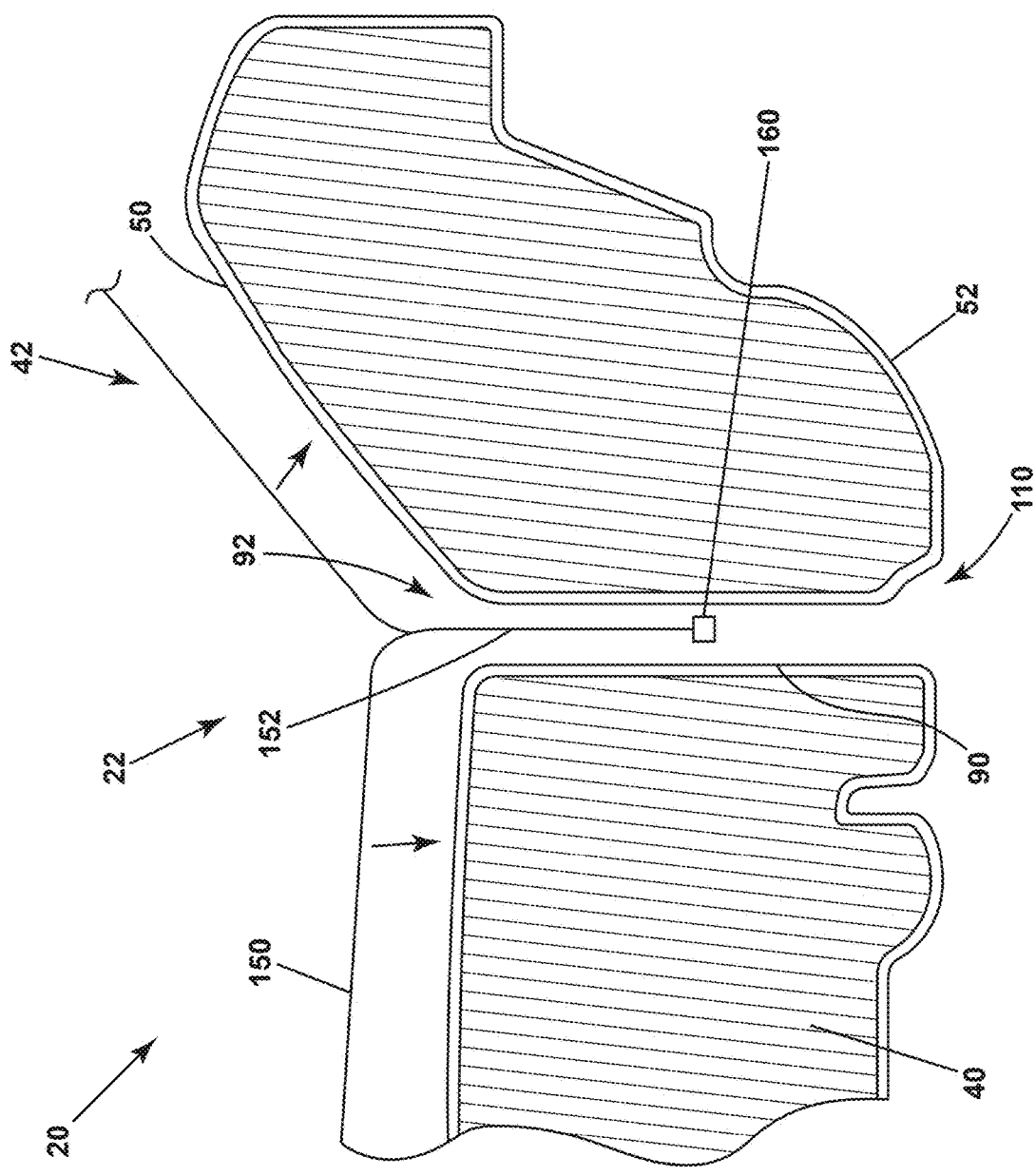
FIG. 6 is a partial cross-sectional view along line VI-VI of FIG. 4 generally illustrating an embodiment of a cushion assembly of a seat assembly according to teachings of the present disclosure.

Referring to FIG. 6, a cross-section through the cushion assembly 22 at one of the apertures 90 prior to insertion of the trim wire 44, such as along line XI-XI of FIG. 4, is illustrated. The trim cover 42 is disposed on the cushion 40. The trim cover 42 includes a first portion 150 disposed on the first surface 50 of the cushion 40 and a second portion 152 that extends into a through aperture of the plurality of through apertures 90. The second portion 152 is integrally formed with or attached to (e.g., sewn to) the first portion 150, and may be referred to as a trim listing. An edge piece 160 is connected to the distal end of the second portion 152. The edge piece 160 optionally includes plastic.

Figure 7:
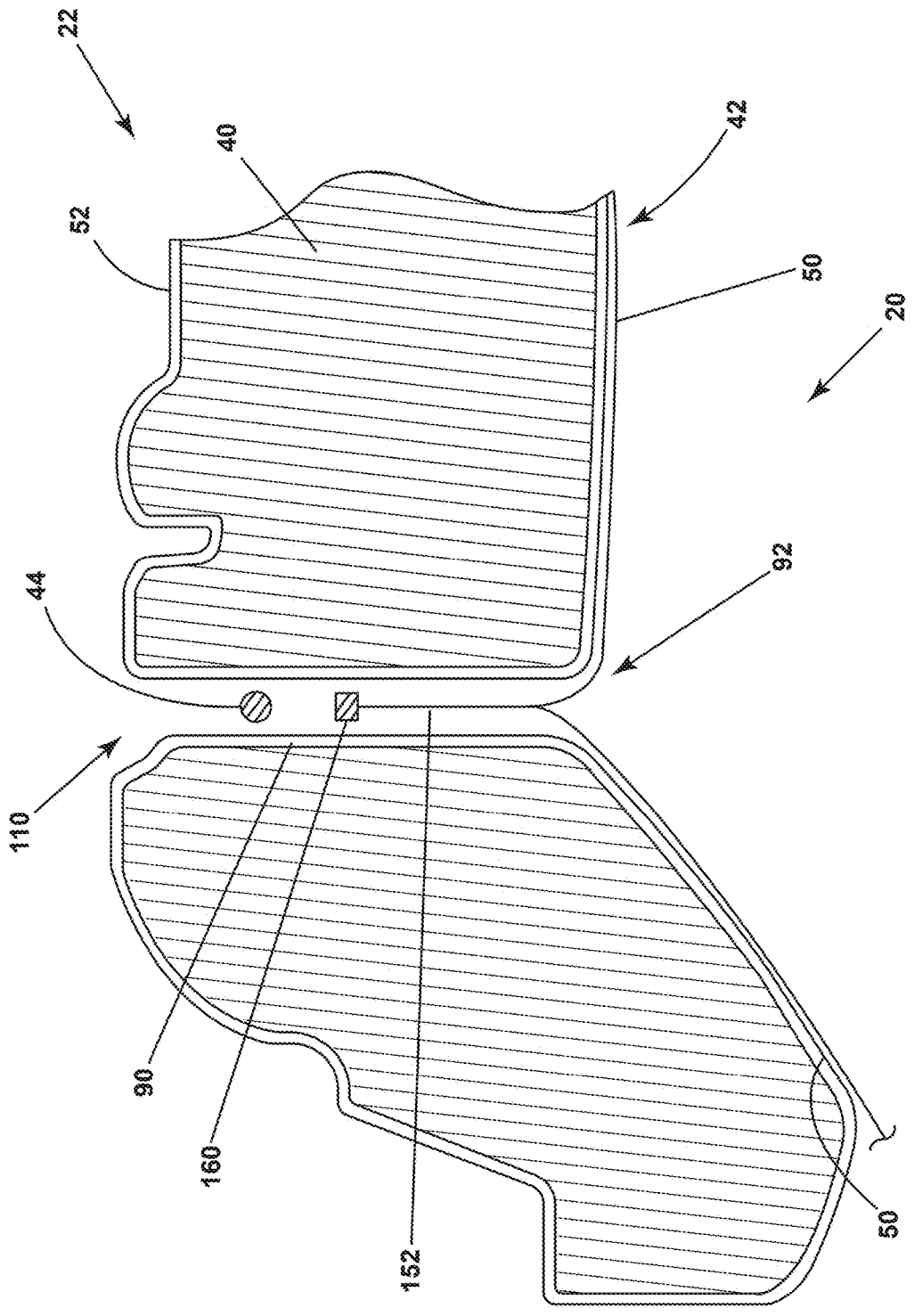
FIG. 7 is a partial cross-sectional view generally illustrating an embodiment of a cushion assembly of a seat assembly according to teachings of the present disclosure.

Referring to FIG. 7, is a modified version of FIG. 6 with the cushion 40 flipped over and the trim wire 44 inserted into the recess 110. For example, the cushion 40 is shown with the first surface 50 facing downward and the second surface 52 facing upward. The trim wire 44 is inserted into the recess 110 (e.g., from above the second surface 52) such that the trim wire 44 is partially aligned with the through aperture 90 and is proximate the second portion 152 of the trim cover 42.

Figure 8:
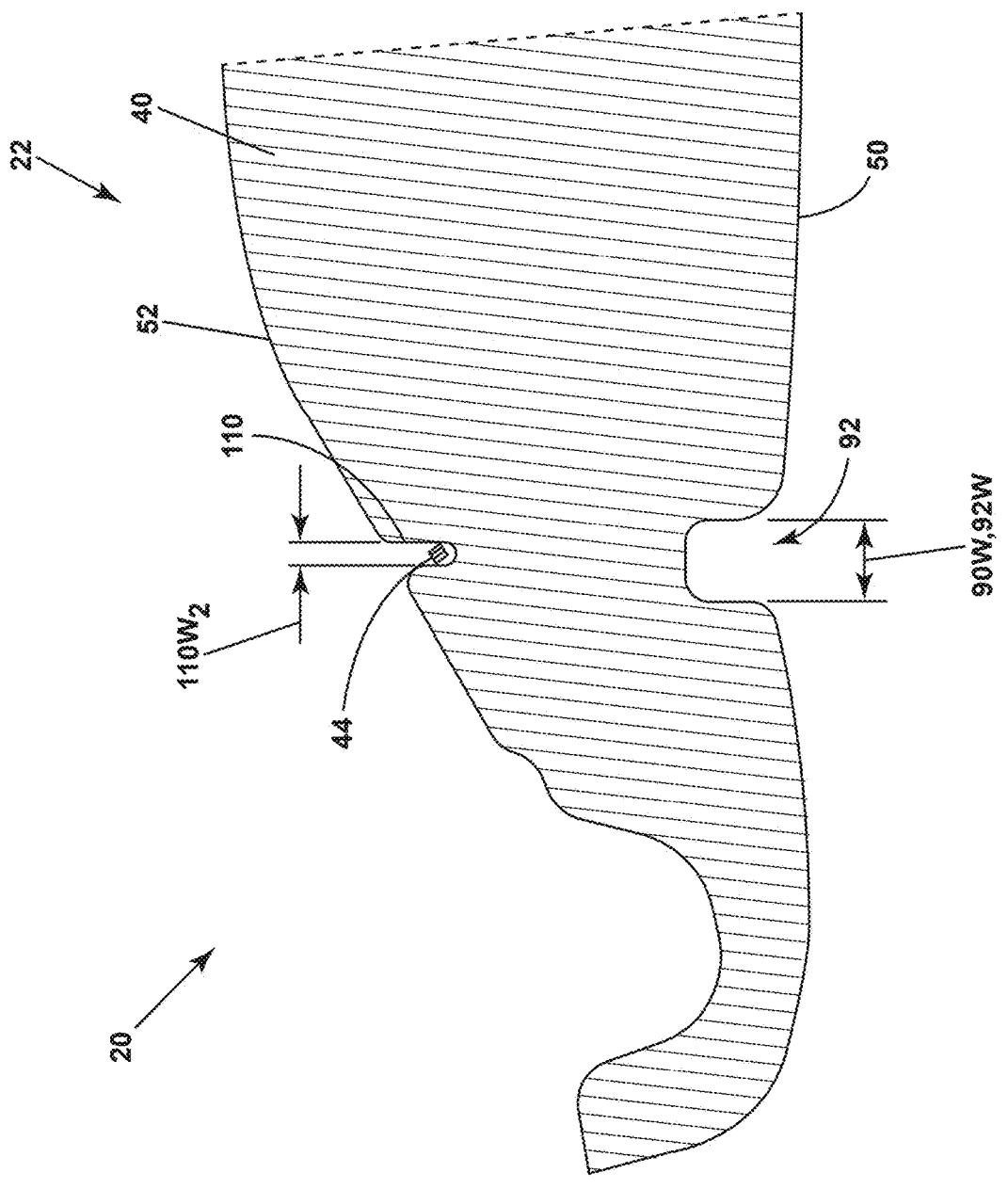
FIG. 8 is a partial cross-sectional view along line IIX-IIX of FIG. 4 generally illustrating an embodiment of a cushion assembly of a seat assembly according to teachings of the present disclosure.

Referring to FIG. 8, a cross-section of the cushion assembly 22 offset from the apertures 90, such as along line IIX-IIX of FIG. 4, is illustrated. The trim wire 44 is disposed in recess 110 and the trim cover 42 is hidden and the trim wire 44 is shown in the recess 110.

Figures 9A, 9B:
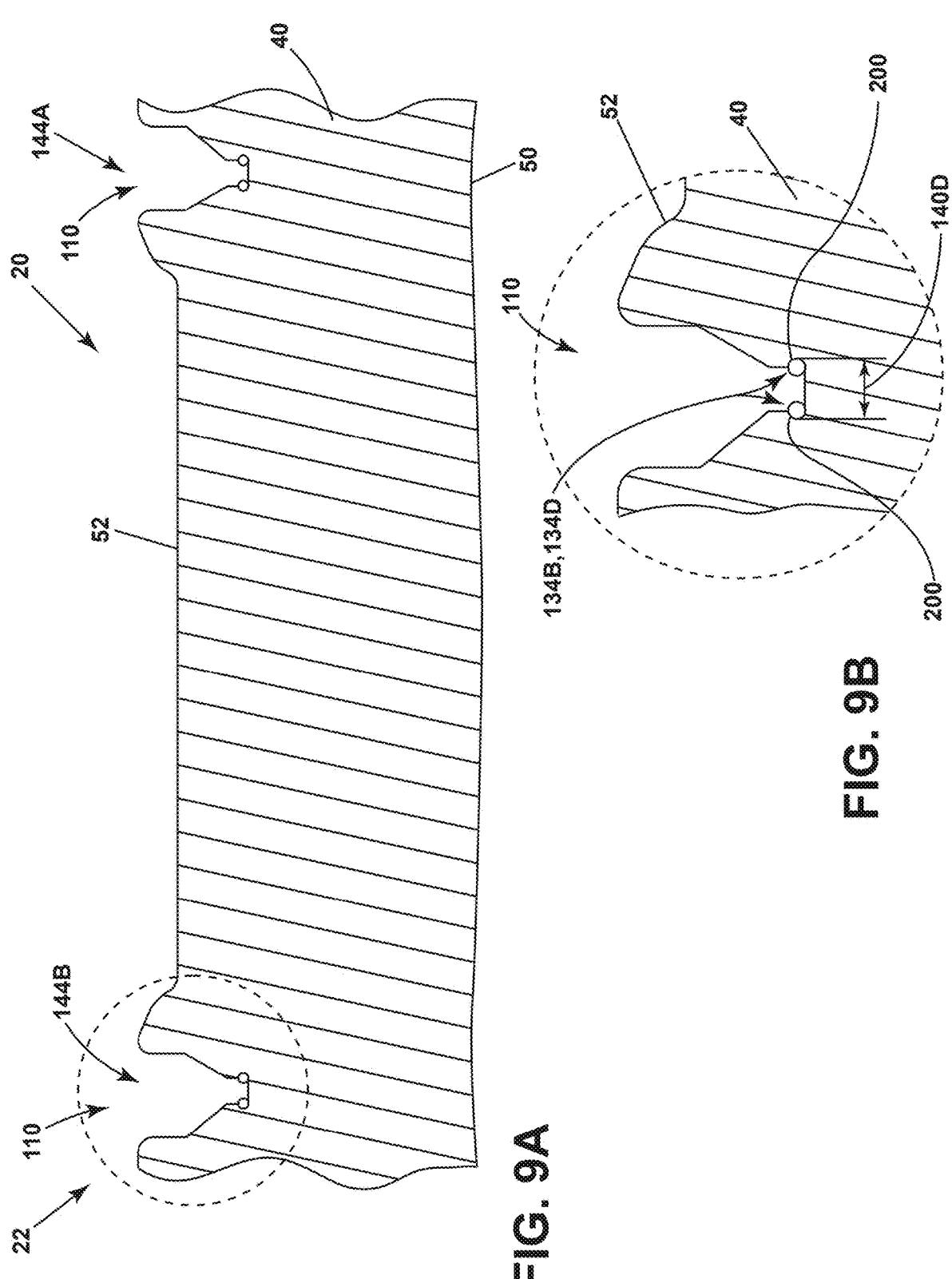
FIG. 9A is a partial cross-sectional view along line IX A-IX A of FIG. 4 generally illustrating an embodiment of a cushion assembly of a seat assembly according to teachings of the present disclosure.
FIG. 9B is an enlarged portion of FIG. 9A.

Referring to FIG. 9A, a cross section through a pair of receptacles, such as through receptacles 144A, 144B and along line IXA-IXA in FIG. 4, is illustrated. FIG. 9B is an enlarged portion of FIG. 9A. The cushion 40 defines one or more undercuts 200 in the recess 110, such as in one or more of the loop receptacles 140A-144A, 140B-144B. The undercuts 200 are defined by a narrower portion of the recess 110 closer to the second surface 52 and a wider portion of the recess 110 adjacent the narrower portion and closer to the first surface 50. The undercuts 200 at least partially receive the trim wire 44. For example, when viewed in cross-section, the undercuts 200 can receive at least 25% of the trim wire 44, which results in at least 25% of the sections of the trim wire 44 in the undercuts 200 not being visible from the second surface 52. Optionally, the undercuts 200 can receive 40%-60% of the trim wire 44, viewed in cross-section. Inserting the trim wire 44 into the undercuts 200 can provide a snap fit connection between the trim wire 44 and the cushion 40 such that inserting the trim wire 44 into the recess 110 includes snap fitting the trim wire 44 with the cushion 40.

Figure 10:
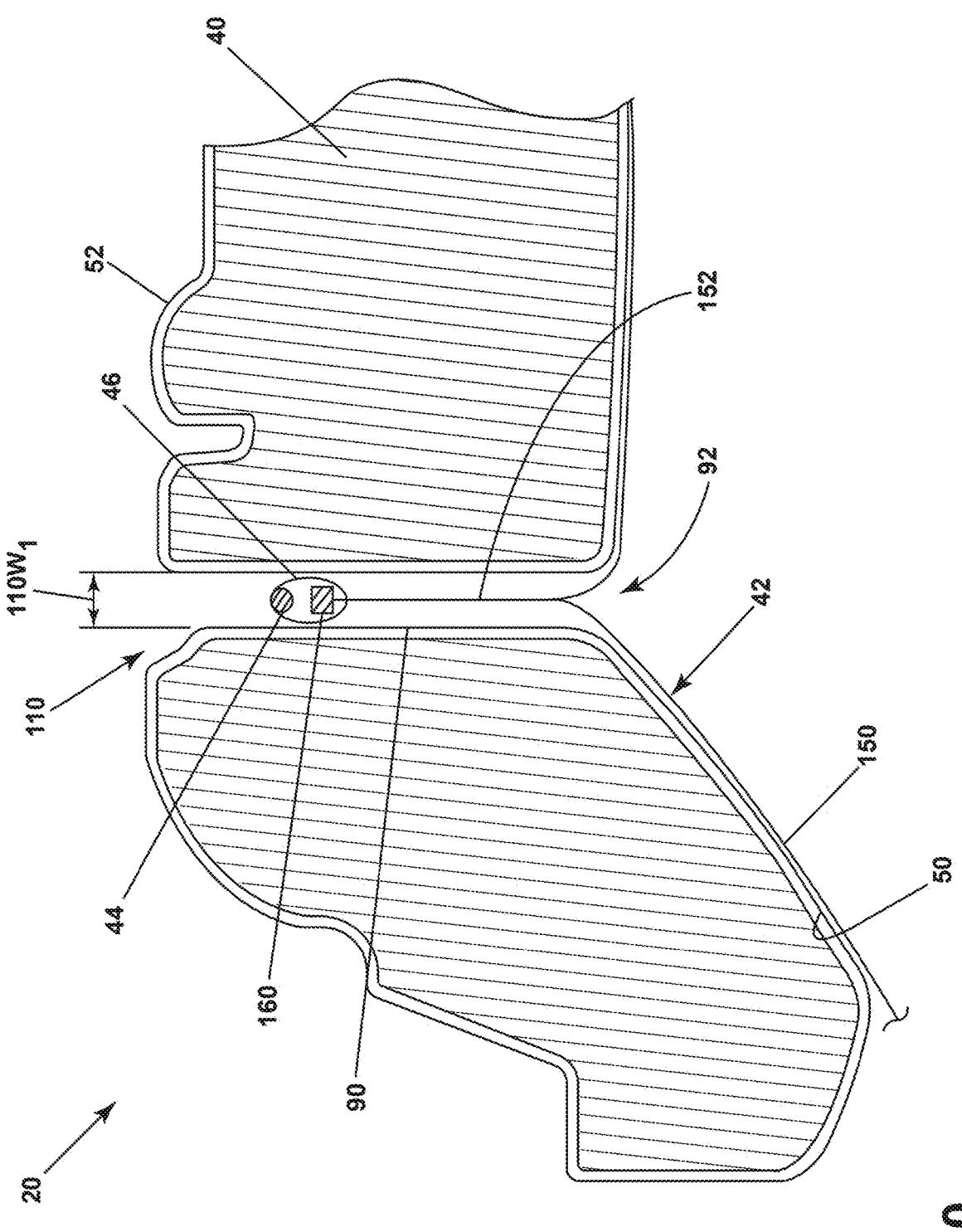
FIG. 10 is a partial cross-sectional view generally illustrating an embodiment of a cushion assembly of a seat assembly according to teachings of the present disclosure.

Referring to FIG. 10, the coupling 46 connects the trim cover 42 with the trim wire 44, such as by connecting the trim wire 44 to the second portion 152 of the trim cover 42. The coupling 46 extends through the second portion 152 and/or around the edge piece 160 such that a section of the second portion 152 and/or a section of the edge piece is disposed in the coupling 46.

The coupling 46 can include one or more of a variety of configurations. Optionally, the coupling 46 includes a hog ring, such as a metal hog ring, but can include other configurations, such a polymer hog ring. The coupling 46 can be round, rounded, or oval-shaped, among other configurations. Connecting the coupling 46 to the trim cover 42 and the trim wire 44 can apply tension to the trim cover 42, such as to pull the trim cover 42 tight against the first surface 50 of the cushion 40. Connecting the coupling 46 with the trim cover 42 and the trim wire 44 may not involve substantial movement, bending, or deformation of the trim wire 44. For example, movement, bending, and/or deformation of the trim wire 44, if any, may be limited to that resulting from compression of the cushion 40. Connecting the coupling 46 with the trim cover 42 includes inserting the coupling 46 through the trim cover 42 and around the edge piece 160 such that some of the trim cover 42 and some of the edge piece 160 are disposed within the coupling 46, and/or such that the coupling 46 is in contact with one or both of the second portion 152 or the edge piece 160.

The trim cover 42 includes a second portion 152 for each through aperture 90 (or vice versa), and the cushion assembly 22 includes a coupling 46 for each second portion 152 for connecting the second portions 152 with the trim wire 44. The number and locations of the second portions 152, apertures 90, and couplings 46 can vary, such as depending on the type of cushion 40, the style of the trim cover 42, or both.

Figure 11:
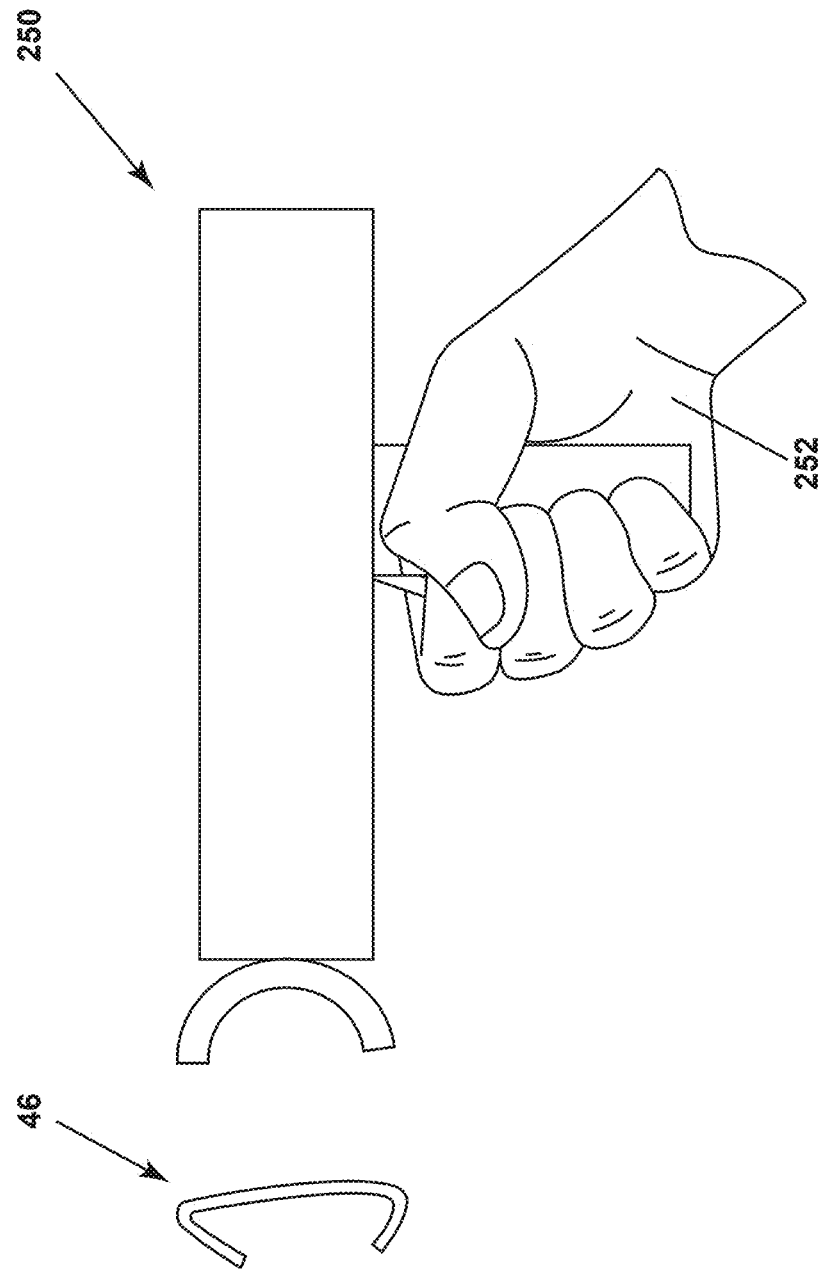
FIG. 11 is a schematic view generally illustrating embodiments a coupling and a coupling tool according to teachings of the present disclosure.

Referring to FIG. 11, a schematic drawing of a coupling tool 250 and the coupling 46 are shown. If the coupling 46 includes a hog ring, the coupling tool 250 can, for example, include a hog ring gun. The coupling tool 250 can deform the coupling 46 from an initial/open state, shown in FIG. 11, to a closed state, such as shown in FIG. 10. The apertures 90 and/or the recess 110 may be large enough to receive a portion of the coupling tool 250 during connection of the trim cover 42 with the trim wire 44. For example, connecting the trim cover 42 with the trim wire 44 can include inserting the coupling tool 250 partially into the apertures 90 and/or the recess 110. In some configurations, the width 90W of the apertures 90 can correspond to a dimension of the coupling tool 250, a dimension of a hand 252 of a user/operator assembling the cushion assembly 22, or both. For example, the width 90W may be large enough to all for partial insertion of the coupling tool 250 into the aperture to connect the coupling 46 with the trim cover 42 and the trim wire 44. Additionally or alternatively, the width 90W may be large enough for at least two fingers of the hand 252 of the user to be inserted into the aperture to grasp the second portion 152 of the trim cover 42 and pull the second portion 152 toward the second surface 52.

While various examples are described in connection with the first cushion assembly 22, the second cushion assembly 24 can include the same or similar features.

Figure 12:
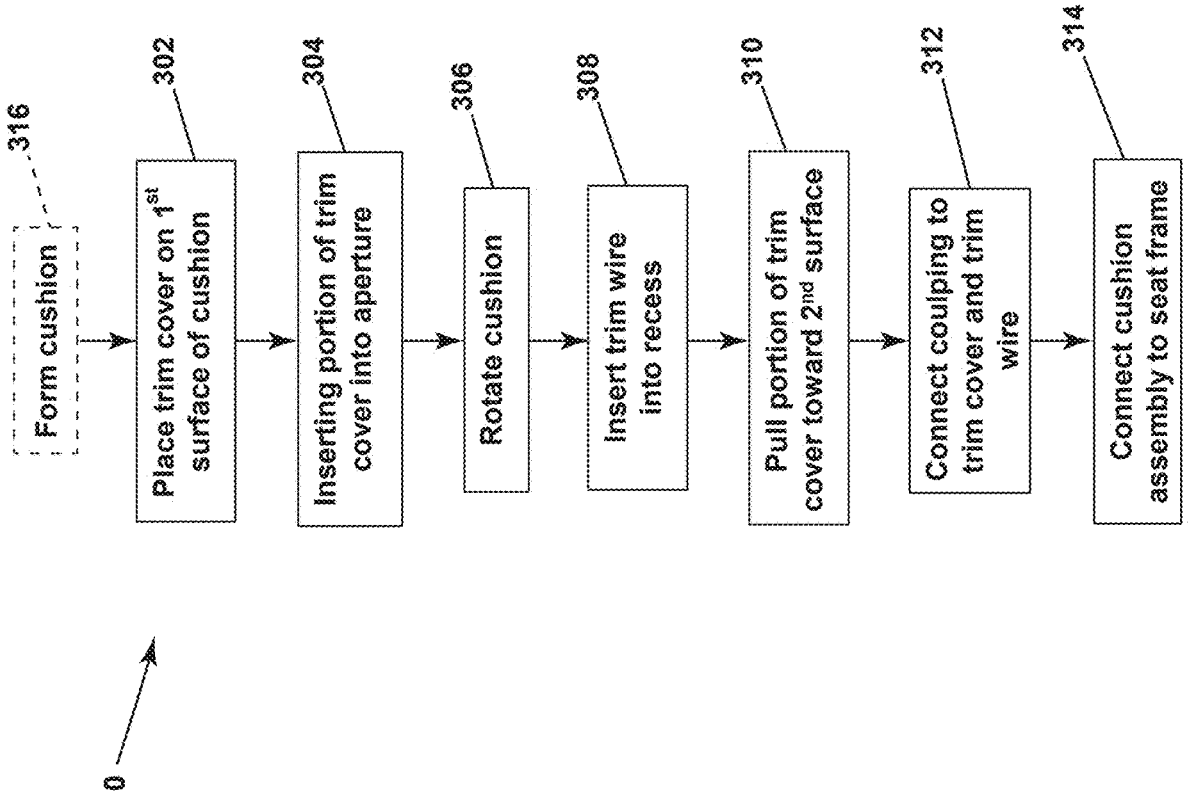
FIG. 12 is a flow diagram generally illustrating an embodiment of a method of assembling a seat assembly according to teachings of the present disclosure.

Referring to FIG. 12, a flow diagram for a method 300 of assembling the seat assembly 20 is illustrated. The method 300 includes placing the trim cover 42 on the first surface 50 of the cushion (block 302), such as while the first surface 50 is facing upward. The method 300 includes inserting a portion of the trim cover 42, such as the second portion(s) 152, into aperture(s) 90 of the cushion 40 (block 304), which can be conducted while placing the trim cover 42 on the first surface 50 in block 302. Block 304 can include inserting each second portion 152 include a respective through aperture of the plurality of through apertures 90. The method 300 includes rotating/flipping the cushion 40 such that the second surface 52 is facing upward (block 306). Optionally, block 306 can be omitted, such as if the cushion 40 was not previously disposed with the first surface 50 facing upward.

The method 300 includes inserting the trim wire 44 into the recess 110 (block 308). Inserting the trim wire 44 into the recess 110 includes inserting the trim wire segments 130-134 into the respective recess segment 120-124 and inserting the loops 130C-134C, 130D-134D into the receptacles 140A 142A, 144A, 140B, 142B, 144B, which can include inserting the trim wire 44 into one or more undercuts 200 and/or snap fitting the trim wire 44 with the cushion 40.

The method 300 includes pulling the second portions 152 of the trim cover 42 in the through apertures 90 toward the second surface 52 and the trim wire 44 (block 310). The method 300 includes connecting the coupling 46 with the trim cover 42 and the trim wire 44 (block 312), which forms the cushion assembly 22. In some instances, pulling of the second portions 152 in block 310 can be conducted as part of connecting the coupling 46 in block 312. Block 312 can include connecting a respective coupling 46 with each second portion 152 of the trim cover 42 and the trim wire 44. The trim wire 44 may remain in a substantially fixed position (e.g., does not move to a material extent) relative to the cushion 40 after being inserted in block 308, including during connecting the coupling 46 in block 312. Connecting the coupling 46 with the trim cover 42 and the trim wire 44 can include closing the coupling 46 such that trim cover 42 and the trim 44 wire are not configured for disconnection without altering the coupling 46 (e.g., via cutting, bending, etc.), which can reduce unintended disconnections.

The method 300 includes connecting the cushion assembly 22 to the seat frame 26 (block 314). The method 300 may not include directly connecting the trim cover 42 or the trim wire 44 directly to the seat frame 26. For example, the trim cover 42 and the trim wire 44 may only be indirectly connected to the seat frame 26 via the cushion 40.

In some examples, the method 300 can include forming the cushion 40 (block 316), such as prior to block 302. Forming the cushion 40 can include molding the cushion 40 with foam, such as independently of other components of the seat assembly 20. For example, the cushion 40 can be formed independently of and separate from the trim wire 44 and the coupling(s) 46, and can be devoid of metal, clips, wires, embedded plastic components, embedded metal components, and/or other components.

While the method 300 is described in connection with the first cushion assembly 22, the method 300 can applied in a corresponding manner to second cushion assembly 24.

The trim wire 44 is detachably connected to the second surface 52, such as via the snap fit with the undercut. Even after connecting the trim cover 42 is connected with the trim wire 44 via the coupling 46, removing the coupling 46 allow for immediate detachment/disconnection of the trim wire 44 from the cushion 40, which can facilitate recycling of the cushion 40 and/or the trim wire 44.

Embodiments of seat assemblies 20 can be easier to recycle than other designs. For example, by removing (e.g., cutting, severing,) the coupling(s) 46, the trim cover 42 and the trim wire 44 can be immediately removed from the cushion 40, such as without materially modifying or damaging the cushion 40. In designs with components (e.g., wires, clips, etc.) that are molded/embedded into the cushion, the cushion often is cut into pieces, which can be less efficient (e.g., time efficient, percent of material recycled, etc.). Additionally or alternatively, with embodiments of the seat assemblies 20, the distance between the trim wire 44 and the first surface 50 of the cushion 40 can be more consistent and/or the amount of tension applied to the trim cover 42 by connecting the trim cover 42 to the trim wire 44 via the coupling 46 can be more consistent than other designs (e.g., because the trim wire 44 can be disposed in a substantially fixed position in the recess 110 during assembly), such as designs that use a draw-type string or cord that is pulled tight by an operator during assembly. For example, as each operator may have a different level of strength, the forces applied by the draw-type string or cord can vary greatly from one assembly to the next, which can result in undesirable variations in appearance of the trim cover 42 (e.g., too much tension, not enough tension, etc.).

The instant disclosure includes the following non-limiting embodiments:

1. A seat assembly, comprising: a cushion including a first surface, a second surface, and a through aperture extending from the first surface to the second surface; a trim cover disposed on the first surface; a trim wire detachably connected to the second surface; and a coupling connecting the trim cover to the trim wire.

2. The seat assembly of any preceding embodiment, wherein the cushion defines a recess disposed in the second surface; the through aperture extends from the first surface to the recess; and the trim wire is at least partially disposed in the recess.

3. The seat assembly of any preceding embodiment, wherein an end of the trim wire includes a loop that restricts movement of the trim wire in the recess.

4. The seat assembly of any preceding embodiment, wherein the cushion defines an undercut disposed in the recess; and the trim wire is partially disposed in the undercut.

5. The seat assembly of any preceding embodiment, wherein a width of the recess is equal to or between 5% and 50% of a width of the through aperture.

6. The seat assembly of any preceding embodiment, wherein a width of the through aperture is equal to or between 10 mm and 25 mm and a length of the through aperture is longer than the width.

7. The seat assembly of any preceding embodiment, wherein the width of the through aperture corresponds to a dimension of a coupling tool, a dimension of a hand of a user, or both.

8. The seat assembly of any preceding embodiment, wherein the recess includes a plurality of separate recess segments; and the trim wire includes a plurality of separate trim wire segments disposed in respective recess segments of the plurality of separate recess segments.

9. The seat assembly of any preceding embodiment, wherein the plurality of separate recess segments includes a first recess segment and a second recess segment; the cushion defines a plurality of through apertures including the through aperture, a second through aperture, a third through aperture, and a fourth through aperture; the through aperture and the second through aperture extend to the first recess segment; and the third through aperture and the fourth through aperture extend to the second recess segment.

10. The seat assembly of any preceding embodiment, wherein the cushion is devoid of metal.

11. The seat assembly of any preceding embodiment, comprising a seat frame; wherein the cushion is connected to the seat frame; and the trim cover, the trim wire, and the coupling are not directly connected to the seat frame.

12. The seat assembly of any preceding embodiment, wherein the trim cover, the trim wire, and the coupling are indirectly connected to the seat frame via the cushion.

13. The seat assembly of any preceding embodiment, wherein the trim wire is rigid.

14. The seat assembly of any preceding embodiment, wherein the coupling includes a metal hog ring.

15. The seat assembly of any preceding embodiment, wherein the trim wire is snap fit with the cushion.

16. The seat assembly of any preceding embodiment, wherein the cushion is not molded with the trim wire or the coupling.

17. The seat assembly of any preceding embodiment, wherein the cushion is a seat base cushion or a seat back cushion.

18. A method of assembling the seat assembly of any preceding embodiment, the method comprising: disposing the trim cover on the first surface of the cushion;

inserting a portion of the trim cover into the through aperture; inserting the trim wire into the recess such that the trim wire is detachably connected to the cushion; and connecting the portion of the trim cover to the trim wire via the coupling.

19. The method of any preceding embodiment, further comprising molding the cushion separate from the trim wire and the coupling.

20. The method of any preceding embodiment, wherein inserting the trim wire into the recess includes snap fitting the trim wire with the cushion.

21. The seat assembly of any preceding embodiment, wherein the cushion is devoid of embedded plastic components and embedded metal components.

22. The seat assembly of any preceding embodiment, wherein the cushion is molded separately from all other components of the seat assembly.

23. The seat assembly of any preceding embodiment, comprising a plurality of couplings including the coupling; wherein the plurality of couplings connect the trim cover with the trim wire; and the trim cover is removable from the seat assembly via severing the plurality of couplings.

24. A vehicle comprising the seat assembly of any preceding embodiment.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof. The word "exemplary" is used herein to mean "serving as a non-limiting example."

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "at least one of" in the context of, e.g., "at least one of A, B, and C" or "at least one of A, B, or C" includes only A, only B, only C, or any combination or subset of A, B, and C, including any combination or subset of one or a plurality of A, one or a plurality of B, and one or a plurality of C.

Although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. The term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A seat assembly, comprising:
   a cushion including a first surface, a second surface, and a through aperture extending from the first surface to the second surface, wherein the cushion defines a recess disposed on the second surface;
   a trim cover disposed on the first surface;
   a trim wire detachably connected to the second surface, wherein the trim wire comprises at least: a first loop at a first end of the trim wire and a second loop at a second end of the trim wire, and wherein the first loop is adapted to be received within a first loop receptacle on the cushion and the second loop is adapted to be received within a second loop receptacle on the cushion to restrict the movement of the trim wire within the recess; and
   a coupling connecting the trim cover to the trim wire.

2. The seat assembly of claim 1, wherein the through aperture extends from the first surface to the recess, and the trim wire is at least partially disposed in the recess.

3. The seat assembly of claim 2, wherein the cushion defines an undercut disposed in the recess, and the trim wire is partially disposed in the undercut.

4. The seat assembly of claim 2, wherein a width of the recess is equal to or between 5% and 50% of a width of the through aperture.

5. The seat assembly of claim 4, wherein a width of the through aperture is equal to or between 10 mm and 25 mm and a length of the through aperture is longer than the width.

6. The seat assembly of claim 4, wherein the width of the through aperture corresponds to at least one of a dimension of a coupling tool and a dimension of a hand of a user.

7. The seat assembly of claim 2, wherein the recess includes a plurality of separate recess segments, and the trim wire includes a plurality of separate trim wire segments disposed in respective recess segments of the plurality of separate recess segments.

8. The seat assembly of claim 7, wherein the plurality of separate recess segments includes a first recess segment and a second recess segment,
   the cushion defines a plurality of through apertures including the through aperture, a second through aperture, a third through aperture, and a fourth through aperture, the through aperture and the second through aperture extend to the first recess segment, and the third through aperture and the fourth through aperture extend to the second recess segment.

9. The seat assembly of claim 7, wherein at least two of the plurality of separate trim wire segments are U-shaped and are oriented to open in opposite directions.

10. The seat assembly of claim 1, wherein the cushion is devoid of metal.

11. The seat assembly of claim 1, comprising a seat frame, wherein the cushion is connected to the seat frame; and the trim cover, the trim wire, and the coupling are not directly connected to the seat frame.

12. The seat assembly of claim 11, wherein the trim cover, the trim wire, and the coupling are indirectly connected to the seat frame via the cushion.

13. The seat assembly of claim 1, wherein the trim wire is rigid.

14. The seat assembly of claim 1, wherein the coupling includes a metal hog ring.

15. The seat assembly of claim 1, wherein the trim wire is snap fit with the cushion.

16. The seat assembly of claim 1, wherein the cushion is not molded with the trim wire or the coupling.

17. The seat assembly of claim 1, wherein the cushion is a seat base cushion or a seat back cushion.

18. A method of assembling the seat assembly of claim 2, the method comprising:

disposing the trim cover on the first surface of the cushion;

inserting a portion of the trim cover into the through aperture;

inserting the trim wire into the recess such that the trim wire is detachably connected to the cushion; and connecting the portion of the trim cover to the trim wire via the coupling.

19. The method of claim 18, further comprising molding the cushion separate from the trim wire and the coupling.

20. The method of claim 18, wherein inserting the trim wire into the recess includes snap fitting the trim wire with the cushion.

* * * * *